(12) United States Patent
Geelen et al.

(10) Patent No.: US 8,483,943 B2
(45) Date of Patent: Jul. 9, 2013

(54) NAVIGATION DEVICE AND METHOD FOR DRIVING BREAK WARNING

(75) Inventors: Pieter Geelen, Amsterdam (NL); Rory Jones, Amsterdam (NL); Sven-Erik Jurgens, Paris (CA)

(73) Assignee: Tomtom International B.V., Amsterdamn (NL)

( * ) Notice: Subject to any disclaimer, the term of this patent is extended or adjusted under 35 U.S.C. 154(b) by 1376 days.

(21) Appl. No.: 11/907,227

(22) Filed: Oct. 10, 2007

(65) Prior Publication Data
US 2008/0167800 A1 Jul. 10, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007, provisional application No. 60/879,601, filed on Jan. 10, 2007.

(51) Int. Cl.
*G01C 21/00* (2006.01)

(52) U.S. Cl.
USPC ............................................ 701/201; 701/431

(58) Field of Classification Search
USPC .................. 340/576, 439; 701/201, 208, 410, 701/431
See application file for complete search history.

(56) References Cited

U.S. PATENT DOCUMENTS

| | | | |
|---|---|---|---|
| 5,559,673 A | 9/1996 | Gagnon et al. | |
| 5,576,931 A | 11/1996 | Crane, Jr. et al. | |
| 5,644,472 A | 7/1997 | Klein | |

(Continued)

FOREIGN PATENT DOCUMENTS

| | | |
|---|---|---|
| DE | 199 33 345 A1 | 1/2001 |
| EP | 1 571 420 A | 9/2005 |
| JP | 2005 055223 A | 3/2005 |

OTHER PUBLICATIONS

PCT/EP2007/008743, International Search Report (ISR) issued by the EPO, Jan. 11, 2008.

*Primary Examiner* — Mark Hellner

(57) ABSTRACT

A method and device are disclosed for navigation. In at least one embodiment, the method includes determining a route of travel, in a navigation device, based upon at least a received destination location; determining whether or not travel along the determined route will at least one of meet and exceed a first threshold; and prompting, upon determining that travel along the determined route will at least one of meet and exceed the first threshold, a user of the navigation device to enable output of a warning to break from driving a vehicle, in which the navigation device is located, during travel along the determined route. In at least one embodiment, the navigation device includes a processor to determine a route of travel based upon at least a received destination location and to determine whether or not travel along the determined route will at least one of meet and exceed a first threshold; and an output device to prompt, upon the processor determining that travel along the determined route will at least one of meet and exceed the first threshold, a user of the navigation device to enable output of a warning to break from driving a vehicle, in which the navigation device is located, during travel along the determined route.

101 Claims, 11 Drawing Sheets

U.S. PATENT DOCUMENTS

| | | | | |
|---|---|---|---|---|
| 5,892,654 | A | 4/1999 | Worden, Jr. | |
| 5,949,646 | A | 9/1999 | Lee et al. | |
| 6,014,081 | A * | 1/2000 | Kojima et al. | 340/576 |
| 6,034,870 | A | 3/2000 | Osborn et al. | |
| 6,052,281 | A | 4/2000 | Hardt et al. | |
| 6,134,107 | A | 10/2000 | Kerrigan et al. | |
| 6,141,213 | A | 10/2000 | Antonuccio et al. | |
| 6,381,138 | B1 | 4/2002 | Chen | |
| D460,965 | S | 7/2002 | O'Brien | |
| 6,807,481 | B1 * | 10/2004 | Gastelum | 701/209 |
| 6,867,960 | B2 | 3/2005 | Chou | |
| 6,958,906 | B2 | 10/2005 | Wu et al. | |
| 7,205,474 | B2 | 4/2007 | Ya | |
| 7,226,353 | B2 | 6/2007 | Bettridge et al. | |
| 7,238,104 | B1 | 7/2007 | Greenslade et al. | |
| 7,245,486 | B2 | 7/2007 | Kumano et al. | |
| 2002/0035421 | A1 * | 3/2002 | Warkentin | 701/29 |
| 2003/0184961 | A1 | 10/2003 | Ahn | |
| 2005/0216185 | A1 * | 9/2005 | Takezaki et al. | 701/200 |
| 2006/0241862 | A1 * | 10/2006 | Ichihara et al. | 701/209 |
| 2006/0244825 | A1 * | 11/2006 | Wang et al. | 348/115 |
| 2007/0103858 | A1 | 5/2007 | Lan et al. | |
| 2007/0271022 | A1 * | 11/2007 | Morisset et al. | 701/99 |

* cited by examiner

Icon (blue)

Icon (blue)

Icon (red)

Safety warnings

| | |
|---|---|
| ☐ | Sharp turn warning |
| ☐ | Warn for nearby school/ place of worship/school |
| ☐ | Road rules warning |
| ✓ | Driving break warning |
| ☐ | Show legal notice |

Done

*Fig. 8*

NAVIGATION DEVICE AND METHOD FOR DRIVING BREAK WARNING

PRIORITY STATEMENT

The present application hereby claims priority under 35 U.S.C. §119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, 60/879,529 filed Jan. 10, 2007, 60/879,601 filed Jan. 10, 2007, the entire contents of each of which is hereby incorporated herein by reference.

CO-PENDING APPLICATIONS

The following applications are being filed concurrently with the present application. The entire contents of each of the following applications is hereby incorporated herein by reference: A NAVIGATION DEVICE AND METHOD FOR EARLY INSTRUCTION OUTPUT 11/907,229 filed on even date herewith; A NAVIGATION DEVICE AND METHOD FOR ESTABLISHING AND USING PROFILES 11/907,230 filed on even date herewith; A NAVIGATION DEVICE AND METHOD FOR ENHANCED MAP DISPLAY 11/907,231 filed on even date herewith; A NAVIGATION DEVICE AND METHOD RELATING TO AN AUDIBLE RECOGNITION MODE 11/907,232 filed on even date herewith; NAVIGATION DEVICE AND METHOD FOR PROVIDING POINTS OF INTEREST 11/907,233 filed on even date herewith; A NAVIGATION DEVICE AND METHOD FOR FUEL PRICING DISPLAY 11/907,234 filed on even date herewith; A NAVIGATION DEVICE AND METHOD FOR INFORMATIONAL SCREEN DISPLAY 11/907,235 filed on even date herewith; A NAVIGATION DEVICE AND METHOD FOR DEALING WITH LIMITED ACCESS ROADS 11/907,243 filed on even date herewith; A NAVIGATION DEVICE AND METHOD FOR TRAVEL WARNINGS 11/907,244 filed on even date herewith; A NAVIGATION DEVICE AND METHOD FOR ISSUING WARNINGS 11/907,242 filed on even date herewith; A NAVIGATION DEVICE AND METHOD FOR DISPLAY OF POSITION IN TEXT READABLE FORM 11/907,241 filed on even date herewith; A NAVIGATION DEVICE AND METHOD FOR EMERGENCY SERVICE ACCESS 11/907,228 filed on even date herewith; A NAVIGATION DEVICE AND METHOD FOR PROVIDING REGIONAL TRAVEL INFORMATION IN A NAVIGATION DEVICE 11/907,240 filed on even date herewith; A NAVIGATION DEVICE AND METHOD FOR USING SPECIAL CHARACTERS IN A NAVIGATION DEVICE 11/907,239 filed on even date herewith; A NAVIGATION DEVICE AND METHOD USING A PERSONAL AREA NETWORK 11/907,238 filed on even date herewith; A NAVIGATION DEVICE AND METHOD USING A LOCATION MESSAGE 11/907,237 filed on even date herewith; A NAVIGATION DEVICE AND METHOD FOR CONSERVING POWER 11/907,236 filed on even date herewith; A NAVIGATION DEVICE AND METHOD FOR USING A TRAFFIC MESSAGE CHANNEL 11/907,253 filed on even date herewith; A NAVIGATION DEVICE AND METHOD FOR USING A TRAFFIC MESSAGE CHANNEL RESOURCE 11/907,252 filed on even date herewith; A NAVIGATION DEVICE AND METHOD FOR QUICK OPTION ACCESS 11/907,251 filed on even date herewith; and A NAVIGATION DEVICE AND METHOD FOR DISPLAYING A RICH CONTENT DOCUMENT 11/907,257 filed on even date herewith.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device. Such routes of travel, however, may be long and arduous.

SUMMARY

The inventors discovered that on such long routes of travel, problems such as fatigue may be likely. Thus, the inventors of the present application developed a warning method and implementation on a navigation device, to warn users of the navigation device to take a break from driving on such long trips.

In at least one embodiment of the present application, a method includes determining a route of travel, in a navigation device, based upon at least a received destination location; determining whether or not travel along the determined route will at least one of meet and exceed a first threshold; and prompting, upon determining that travel along the determined route will at least one of meet and exceed the first threshold, a user of the navigation device to enable output of a warning to break from driving a vehicle, in which the navigation device is located, during travel along the determined route.

In at least one embodiment of the present application, a navigation device includes a processor to determine a route of travel based upon at least a received destination location and to determine whether or not travel along the determined route will at least one of meet and exceed a first threshold; and an output device to prompt, upon the processor determining that travel along the determined route will at least one of meet and exceed the first threshold, a user of the navigation device to enable output of a warning to break from driving a vehicle, in which the navigation device is located, during travel along the determined route.

In at least one other embodiment of the present application, a method includes enabling a navigation device to output a warning to break from driving a vehicle, in which the navigation device is located; determining a route of travel, in the navigation device, based upon at least a received destination location; determining whether or not travel along the determined route will at least one of meet and exceed a first threshold; and outputting the warning to break from driving a vehicle, in which the navigation device is located, upon the warning being enabled and upon determining that travel along the determined route will at least one of meet and exceed a first threshold.

In at least one other embodiment of the present application, a device includes an integrated input and display device to enable a navigation device to output a warning to break from driving a vehicle, in which the navigation device is located; and a processor to determine a route of travel, in the navigation device, based upon at least a received destination location and to determine whether or not travel along the determined route will at least one of meet and exceed a first threshold, the warning to break from driving a vehicle, in which the navigation device is located, being output via at least the integrated input and display device upon the warning being enabled and upon the processor determining that travel along the determined route will at least one of meet and exceed a first threshold.

BRIEF DESCRIPTION OF THE DRAWINGS

The present application will be described in more detail below by using example embodiments, which will be explained with the aid of the drawings, in which:

FIG. 8 illustrates an example of a selection screen of an embodiment of the present application.

DETAILED DESCRIPTION OF THE EXAMPLE EMBODIMENTS

Figure 1:
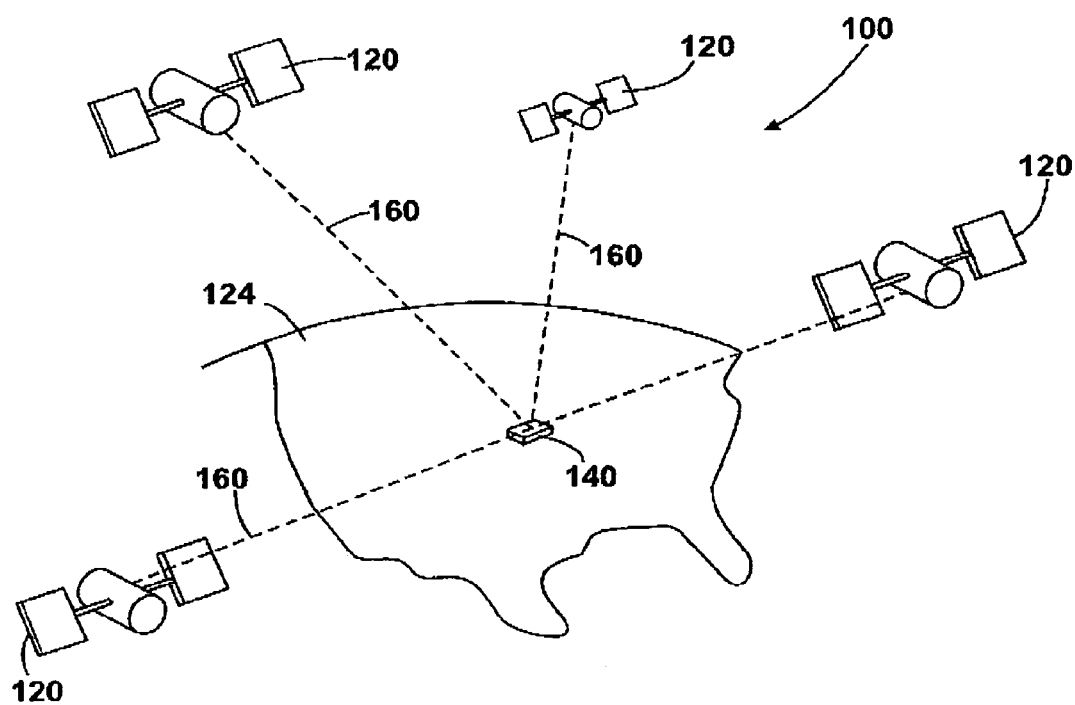
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
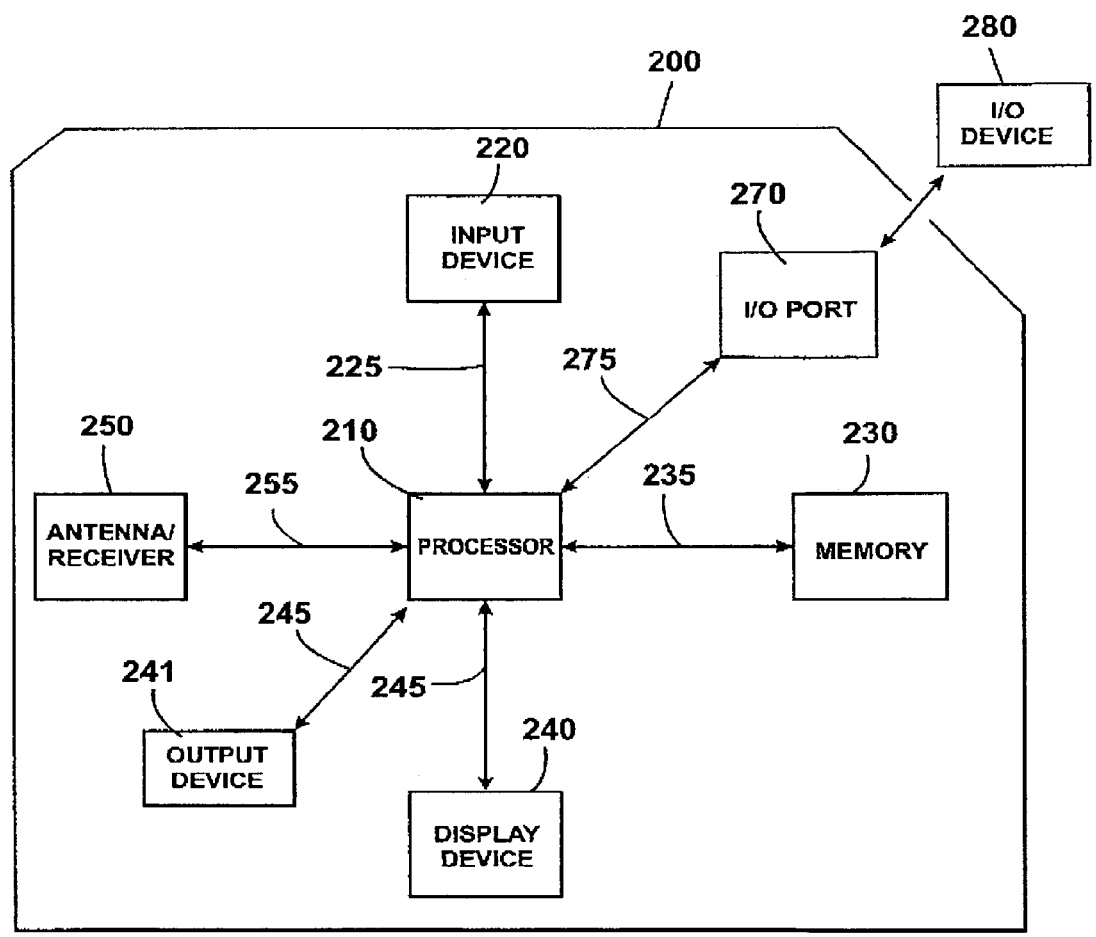
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
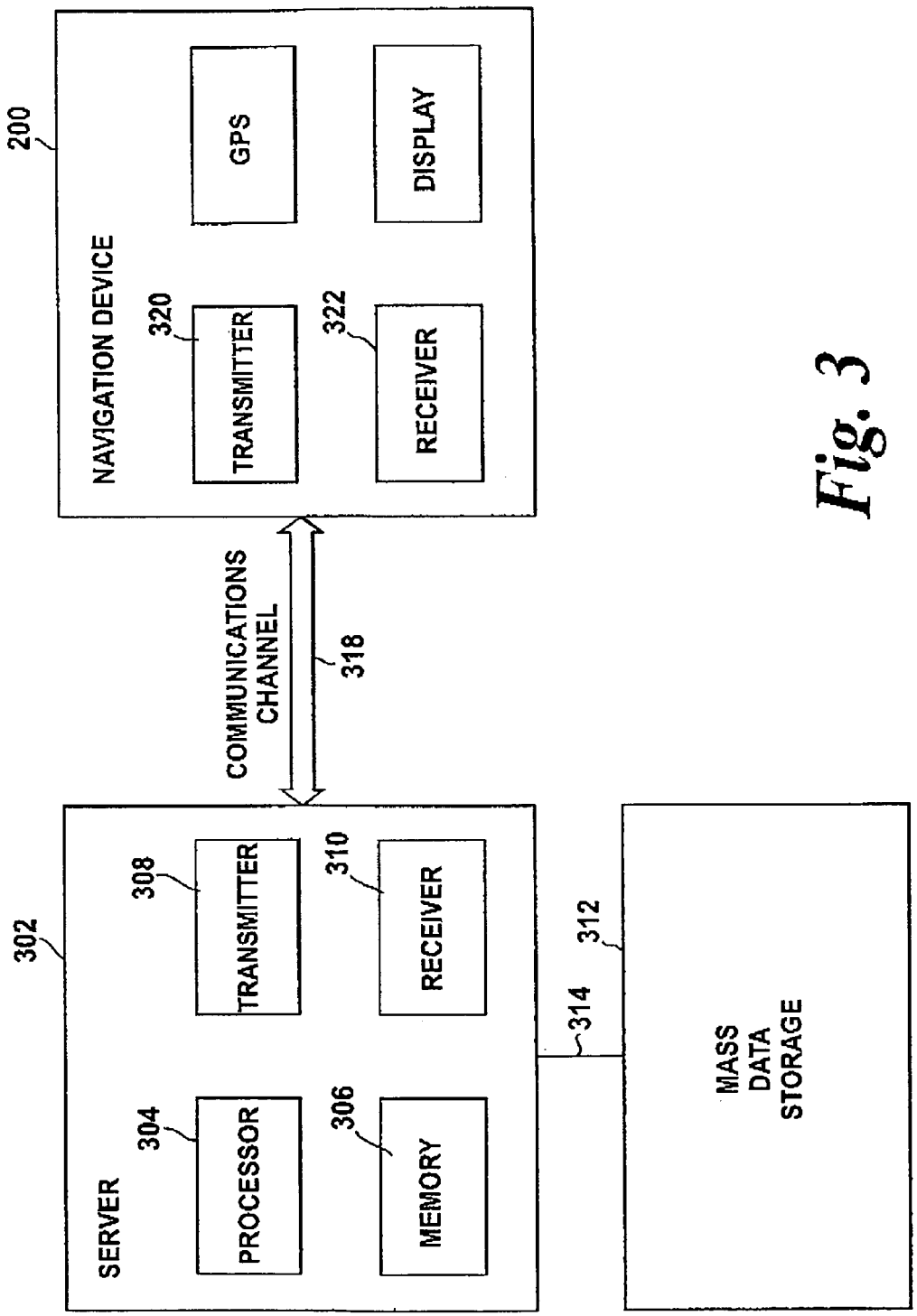
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs; however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
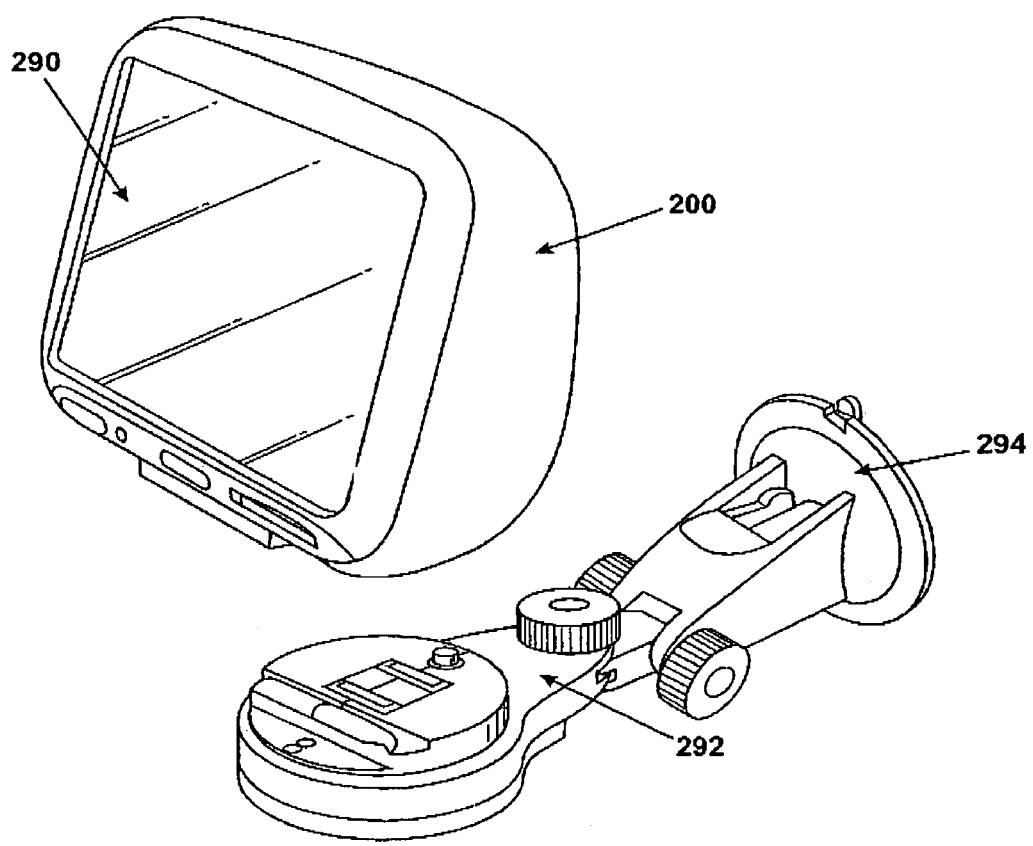
FIGS. 4A and 4B are perspective views of an implementation of an embodiment of the navigation device.
Figure 4B:
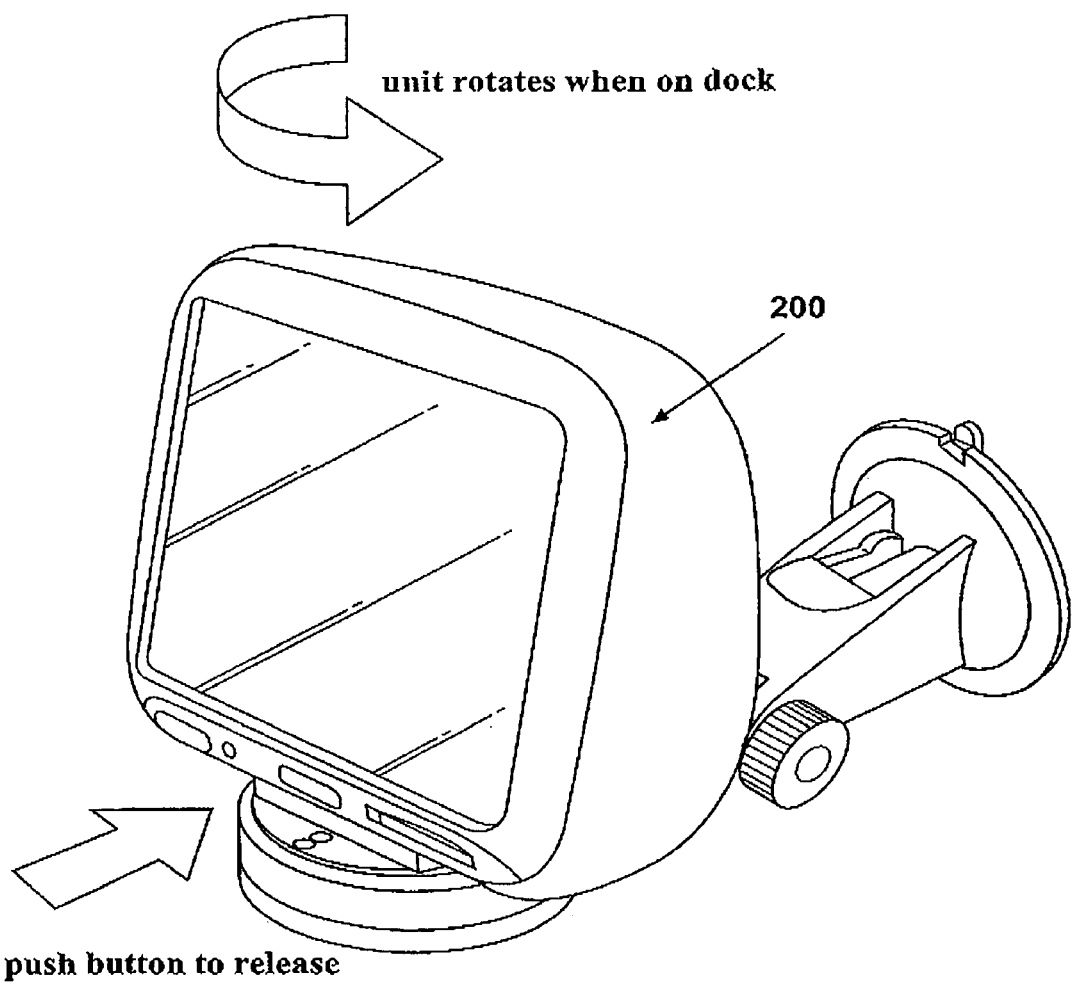

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

The inventors discovered that on such long routes of travel, problems such as fatigue may be likely. Thus, the inventors of the present application developed a warning method and implementation on a navigation device, to warn users of the navigation device to take a break from driving on such long trips.

In at least one embodiment of the present application, a method includes determining a route of travel, in a navigation device 200, based upon at least a received destination location; determining whether or not travel along the determined route will at least one of meet and exceed a first threshold; and prompting, upon determining that travel along the determined route will at least one of meet and exceed the first threshold, a user of the navigation device 200 to enable output of a warning to break from driving a vehicle, in which the navigation device is located, during travel along the determined route.

In at least one embodiment of the present application, a navigation device 200 includes a processor 210 to determine a route of travel based upon at least a received destination location and to determine whether or not travel along the determined route will at least one of meet and exceed a first threshold; and an output device 241 to prompt, upon the processor 210 determining that travel along the determined route will at least one of meet and exceed the first threshold, a user of the navigation device 200 to enable output of a warning to break from driving a vehicle, in which the navigation device 200 is located, during travel along the determined route.

Figure 5A:
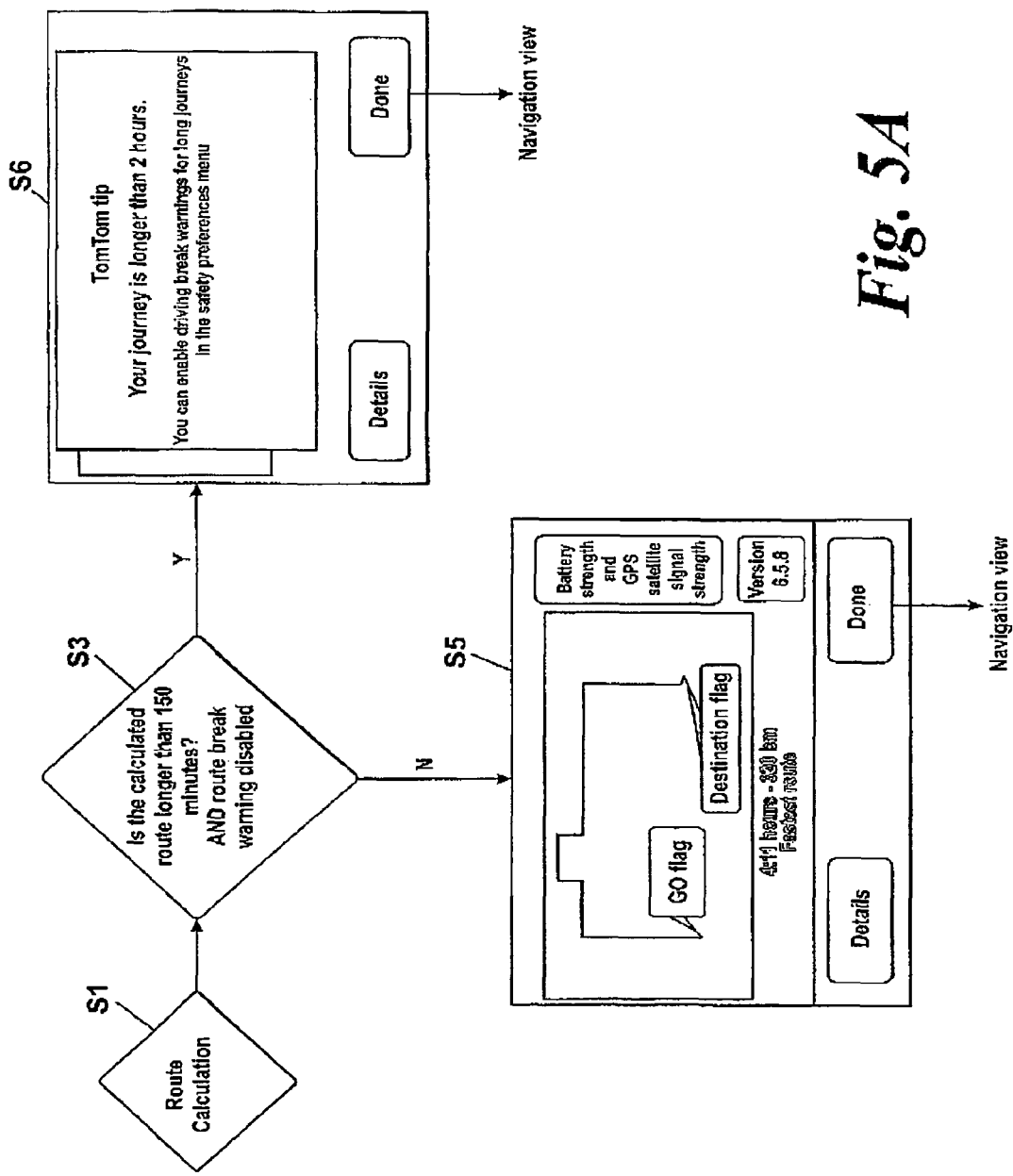
FIG. 5A illustrates an example flow of an embodiment of the present application.

FIG. 5A of the present application illustrates one example of an embodiment of a method of the present application.

As shown in step S1 of FIG. 5A, the route of travel is initially determined or calculated. This can be done in a known manner by processor 210 for example, wherein such a determination or calculation typically includes detection of a current location of the navigation device via a GPS receiver 250 receiving the GPS location of the device; input or selection by a user of a desired destination location, such that the processor 210 receives the destination location; and use of map information stored in memory 230.

Thereafter, in step S3, it is determined, by processor 210 for example, whether or not travel along the determined route will at least one of meet and exceed a first threshold. For example, as shown in step S3, the processor 210 whether or not the calculated route will be longer, in estimated time of travel, than a threshold time of 150 minutes for example. Calculation of estimated time of travel can be achieved by the processor 210 in a known manner based upon the distance of the route of travel and estimated speed limits on the roads of the route of travel, for example, wherein all such data may be stored in memory 230 for example, along with the map information.

Although step S3 illustrates that the calculated route, in estimated time of travel, must be longer than the threshold of 150 minutes, such a determination can be made as to whether or not the calculated route meets or exceeds the 150 minute total, for example. Further, 150 minutes is just an example of a threshold which may be set within the system, noting that an example may be used, for example, to warn a user after the user has been driving for a time such as two hours, for example. Thus, a different time period such as 120 minutes may be used for example, or a time period greater than two hours, noting that the warning can be issued at a different time period, such as the two hour time period, for example, as will be explained hereafter regarding step S6. Accordingly, the 150 minute threshold set in step S3 is a set threshold, but it can be set to any time period (by the system by storing in memory 230 for example, and/or by the user upon being prompted to set such a threshold for example).

Thereafter, if the calculated route of travel is not determined to at least one of meet and exceed the threshold, the method to step S5 and merely displays the calculated or determined route of travel in a normal fashion (an example display being shown in step S5 of FIG. 5A). However, if it is determined that the calculated or determined route of travel does at least one of meet and exceed the threshold, a prompt can be issued in step S6 to the user, to enable output of a warning to the user, to break from driving the vehicle in which the navigation device is located, during travel along the determined route. One example of such a prompt is shown in step S6 of FIG. 5A wherein it states that "Your journey is longer than two hours. You can enable driving break warnings for long journeys in the safety preference menu". Optionally, further details of the driving break warnings may be displayed, and/or the user may just merely be prompted with virtual keys or buttons for example, to select to enable driving break warnings at that moment (without the need to go to a further preference menu). Alternatively, by the user selecting the "Done" virtual button, the warnings may be enabled, for example. Thereafter, the method proceeds to the navigation view and awaits system navigation.

Figure 5B:
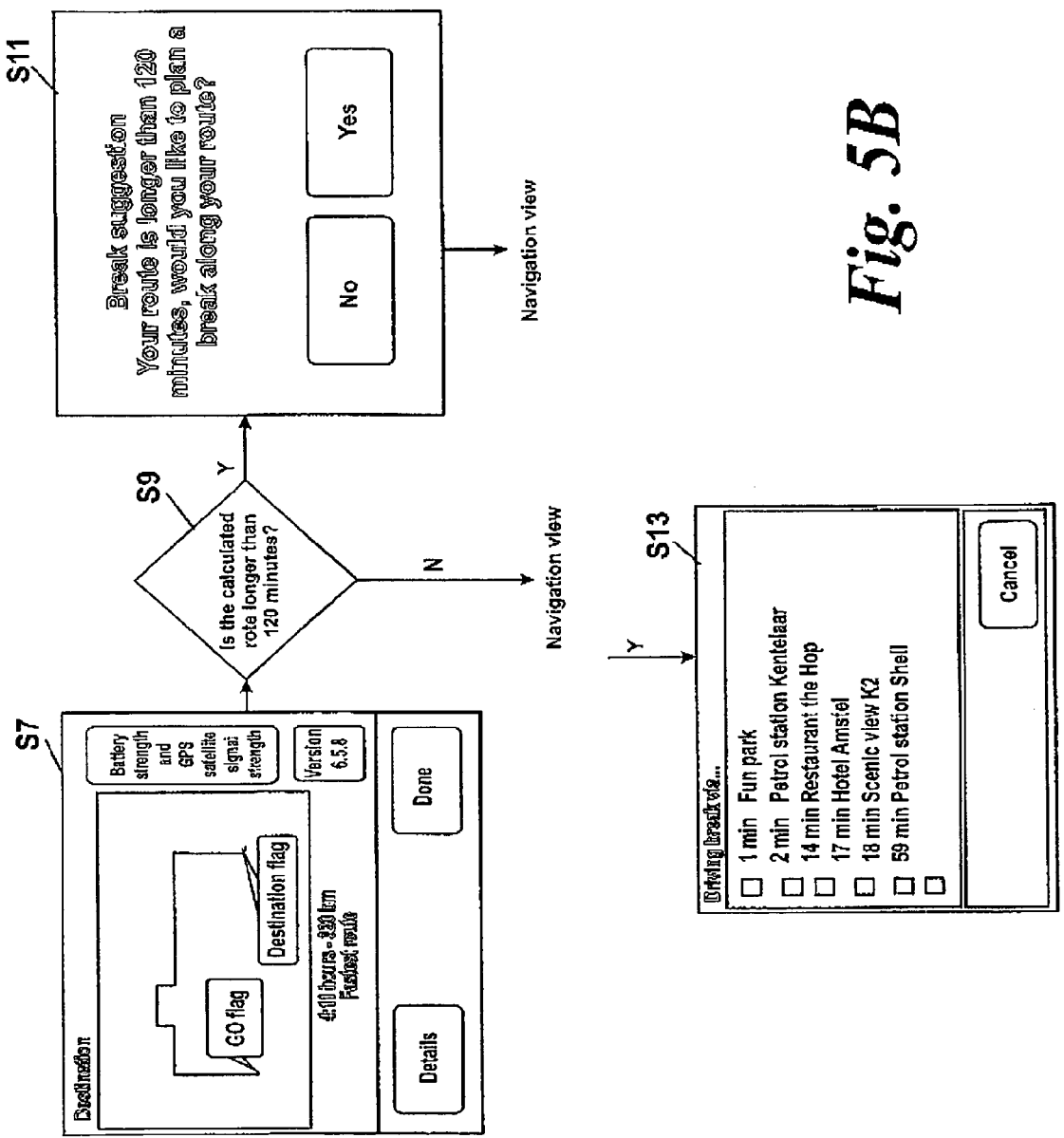
FIG. 5B illustrates an example flow of an embodiment of the present application.

FIG. 5B illustrates an embodiment of the present application. Similar to FIG. 5A, a route of travel is initially determined or calculated in step S7, by processor 210 for example. Thereafter, in step S9, the processor 210 determines whether or not travel along the determined or calculated route of travel will at least one of meet and exceed a first threshold, for example a threshold of 120 minutes. If not, the system proceeds to a normal navigation view, and if so, the system may prompt the user as shown in step S11, for example. As shown in step S11, the prompt may be a display indicating that the route is longer than the threshold, 120 minutes for example, and asks the user if he would like to plan a break along the route. Thus, the user may be prompted, in step S11, to either enable a warning to break from driving the vehicle by selecting the "Yes" virtual button for example, or can choose not to enable the warning by selecting the "No" virtual button. If the user selects "yes", this is received by the processor 210 and thus the processor 210 knows that the user desires to enable the output of a warning to break from driving the vehicle. Thus, during travel along the route, the processor 210 will monitor the time passed and will signal the output of the warning at the appropriate time.

If the user selects "yes", in step S11, the method may proceed to the navigation view, or may alternatively proceed to step S13 wherein choices for implementation of the driving break may be displayed. As the processor 210 has already calculated the route of travel, and knows the threshold of two hours for example, at which the break is to be implemented, it can determined points of interest along the route of travel, and optionally their distances from this "two hour" threshold point along the route. Thus, the processor 210, in response to receipt of an indication of a "yes" selection in step S11, can direct the integrated input and display device 290 to display driving break points of interest as shown in step S13. These can be displayed as selectable options to aid in implementing the driving break in step S13.

Step S13 of FIG. 5B merely illustrates some examples of selectable points of interest for implementing the driving break, wherein these can be displayed after selecting the enablement of the driving break option in step S11 or during the travel along the determined, after (or even in conjunction with) output of the driving break warning during travel along the determined route. The selectable options may be displayed with distances from this "two hour" threshold point along the route (if displayed after enablement of the driving break warning in step S11 for example) or with distances form a current location of the navigation device, if displayed after or in conjunction with the driving break warning during travel along the determined route. Although not shown in FIG. 5A, it should be noted that the display of step S13 of FIG. 5B can be implemented after step S6 of FIG. 5A in the same manner as described above regarding FIG. 5B.

Thus, as shown in FIGS. 5A and 5B, the prompting may include displaying, on an integrated input and display device 290 of the navigation device 200, at least one of a selection to enable output of the warning and a selection not to enable output of the warning, wherein the enabling occurs subsequent to receipt of an indication of a selection to enable the warning. This can be true with regard to either of step S6 of FIG. 5A or step S11 of FIG. 5B, for example.

It should be noted that each of the aforementioned aspects of an embodiment of the present application have been described with regard to the method of the present application. However, at least one embodiment of the present application is directed to a navigation device 200, including a processor 210 to determine a route of travel based upon at least a received destination location and to determine whether or not travel along the determined route will at least one of meet and exceed a first threshold; and an output device 241 to prompt, upon the processor 210 determining that travel along the determined route will at least one of meet and exceed the first threshold, a user of the navigation device 200 to enable output of a warning to break from driving a vehicle, in which the navigation device 200 is located, during travel along the determined route. Such a navigation device 200 may include, as part of the output device 241 for example, an integrated input and display device 290 to enable display and subsequent selection of options, warnings, etc. Thus, such a navigation device 200 may be used to perform the various aspects of the method described with regard to FIGS. 5A and 5B, as would be understood by one of ordinary skill in the art. Thus, further explanation is omitted for the sake of brevity.

Figure 6A:
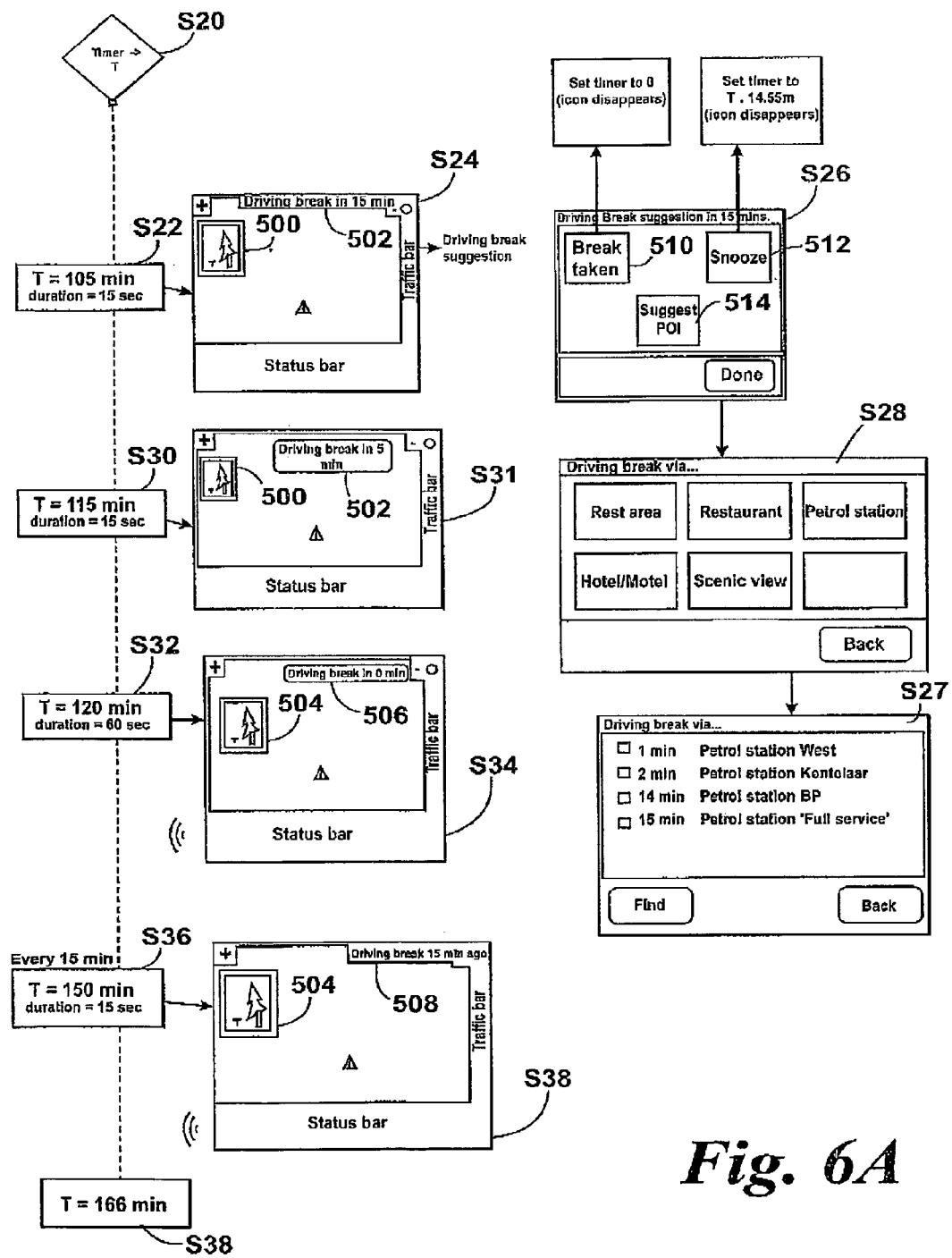
FIG. 6A illustrates an example of a warning output sequence of an embodiment of the present application.
Figure 6B:
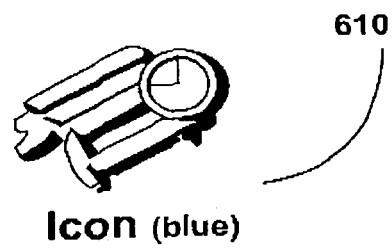
FIG. 6B illustrates an example of alternative warning icons of an embodiment of the present application.
Figure 6B:
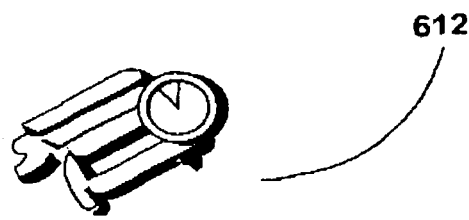
Figure 6B:
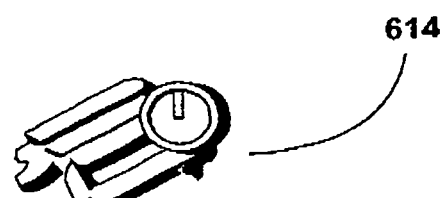

FIGS. 6A and 6B illustrate examples of flowcharts of methodologies of an embodiment for outputting a warning during travel along a route. As shown in FIG. 6A for example, a timer may be initially enabled in step S20. Such a timer can be enabled or reset by the processor 210 for example, and/or when the navigation device 200 is docked in a docking station 292 for example. By use of such a timer (as one non-limiting example embodiment of the present application), a processor 210 of the navigation device 200 can determine, during travel along the determined route and upon the warning being enabled (via the process of FIGS. 5A and/or 5B for example), whether or not at least a second threshold is met, the second threshold being less than the first threshold. Thereafter, upon determining that at least the second threshold is met, a warning may be output.

For example, as shown in FIG. 6A, in step S20 the timer is reset and begins counting until another threshold (a second threshold of 105 minutes for example, compared with a first threshold 120 minutes, for example), is met. Upon determining that this threshold is met, the processor 210 can instruct an output device 241 to output to a user, such as shown in step S24. Such an output can include display of at least one of an icon 500 and a message 502 on an integrated input and display device 290 of the navigation device 200, for example. As indicated in step S22, the warning may be output for a limited duration, such as for 15 seconds for example.

As indicated above, the warning output in step S24 can include at least one of an icon and a message, wherein the at least one of an icon and a message may be displayed on the integrated input and display device 290 of the navigation device 200 for a limited duration. The icon 500 may itself be selectable, such that upon receipt of an indication of selection of the icon, in step S26 the processor 210 may direct a display for at least one of accessing selectable options to aid in implementing the driving break (selectable "suggest POI" virtual button 514 for example), acknowledging that a break has recently been taken (selectable "break taken" virtual button 510 for example), and delaying output of a driving break notification (selectable "snooze" virtual button 512 for example). Thereafter, in step S28, selectable options to aid in implementing the driving break may be displayed including selectable categories as shown in the display of step S28. As shown in step S28, the selectable options may include categories of Points of Interest along the determined route. Thereafter, upon receipt of an indication of a selectable category in step S29, such as the petrol station category for example, different driving break locations and/or distances can be displayed for selection, in a manner similar to that previously discussed in step S13 of FIG. 5B (noting that step S28 may be skipped, with POIs of steps S29 of FIG. 6A and/or step S13 of FIG. 5B being displayed directly).

Thereafter, if the driver chooses to ignore the driving break warning, for example, the system moves to at least one of step S30 and step S32, wherein the processor 210 determines, during travel along the determined route and upon the warning being enabled, whether at least one additional threshold is met, the at least one additional threshold being less than the first threshold (thus, any number of N thresholds may be set during the process of FIG. 6A, for example, before, during and after output of the warning). Upon determining that the at least one additional threshold is met, the warning is again output. For example, as shown in step S30, a next threshold may be that of 115 minutes wherein, once such a threshold is met, a warning is displayed in step S31, again including at least one of an icon 500 and a message 502. Thereafter or subsequent to step S22 (skipping step S30 if the system does not include a threshold such as that shown in Step S30), in step S32, a comparison to at least one additional threshold is made by processor 210 for example. As shown in step S34, once this primary threshold is reached, the display in step S34 may include display of at least one of an icon 504 and message 506, and this display may include elements varied in color based upon the at least one additional threshold being met (such as by displaying at least one of the icon 504 and message 506 in red or another distinct color, for example). This further may include adding an audio output, flashing at least one of the message or icon, or otherwise distinguishing or differentiating at least one of the message and/or icon from that previously displayed. Thus, irrespective of the warning thresholds set in steps S22 and S30, the main threshold driving break time may produce such additional and possibly altered outputs.

Thereafter, if the user still chooses to ignore the driving break message, the process may optionally move to step S36 wherein at a time subsequent to the additional threshold, perhaps at a time equal to the first threshold (if it was 150 minutes for example), warnings may be displayed in step S38 including display of an icon in a different color, and/or an indication that a driving break is overdue. This can also be accompanied by an audible signal, a flashing message, etc., somewhat similar to or further emphasized as compared to the display of S34. Thereafter, upon reaching a threshold greater than that of the first threshold, such as 166 minutes for example, the counter may be reset.

FIG. 6B illustrates a plurality of examples of an icon which could be displayable (in place of icon 500 or 504 for example) in any of steps S24, S31, S34, and S38 of FIG. 6A. For example, the first icon shown in FIG. 6B could be displayable in a first color, such as blue for example, along with some indicator of time remaining before the driving warning should be taken, such as a clock for example. As shown with regard to the icon 610 shown in FIG. 6B, the clock can represent 15 minutes remaining before the break should be taken, and can be displayable in place of the icon and/or driving break messages 500 and 502 shown in step S24 for example. Thus, the icon can (but need not) include two portions, namely a first portion (the picnic table for example) representing the driving break and a second portion including the clock representing the time remaining before a driving break is to take place.

The second icon shown in FIG. 6B is icon 612, one which could be displayable in Step S31 for example, wherein 5 minutes remain before driving break. Finally, the third icon 614 shown in FIG. 6B, can replace the icon displayable in step S34 of FIG. 6A for example, wherein the icon and/or clock can be changed in color, from blue to red for example, to indicate that the driving break time has been reached.

It should be noted that FIGS. 6A and 6B are merely example embodiments, noting that determining whether or not travel along the determined route at least one of meets and exceeds a threshold, such as the second threshold and/or additional thresholds, may be based upon a comparison between the second threshold and a time parameter as shown in FIG. 6A, or may be based upon a comparison between the thresholds and a different parameter, such as a distance parameter for example, via the processor 210 for example. Thus, embodiments of the application should not be limited as such.

Figure 7:
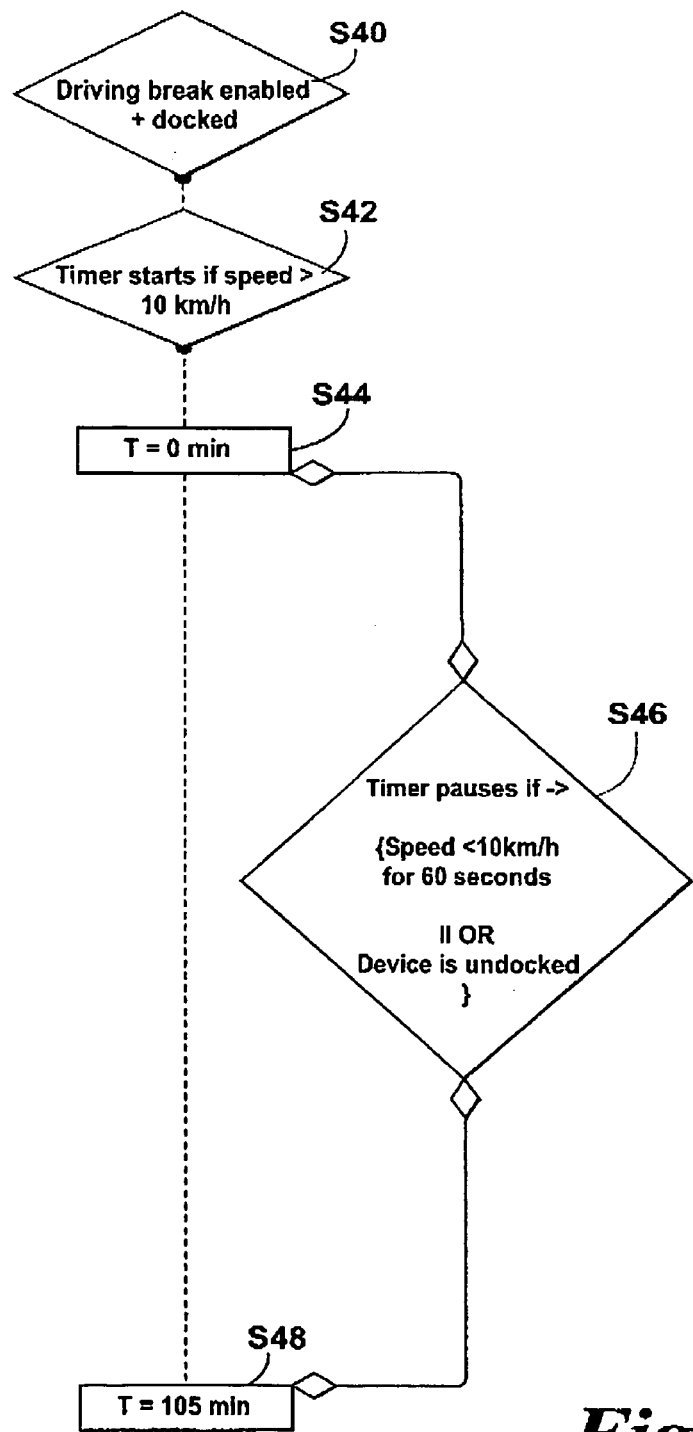
FIG. 7 illustrates an example of a warning output sequence of an embodiment of the present application.

FIG. 7 shows an example of varying the counter used to count a time for comparing to the various thresholds discussed in FIG. 6A for example. As shown in FIG. 7, the time count may begin, for example, at least one of when the navigation device 200 is docked, and when the vehicle in which the navigation device 200 is located, is traveling at a speed above a threshold speed. For example, as shown in step S40 of FIG. 7, it is determined (by processor 210 for example) whether or not the driving break feature is enabled and the navigation device 200 is docked, and thereafter in step S42 the timer starts only after the speed is above a threshold speed, such as 10 kilometers per hour for example. Any of these parameters can be used to initiate a time at which the count begins, such as that in step S44.

Further, as shown in step S46, the time count may be paused at least one of when the navigation device 200 is undocked, and when the vehicle, in which the navigation device 200 is located, is traveling at a speed below a threshold speed. For example, in step S46, the timer is paused if the speed is less than a threshold or equals zero, for example, for a certain duration, such as 60 seconds, for example, or if the navigation device 200 is undocked. This means that the user is probably taking a break. Thereafter, the count continues to step S48, where a first threshold count is met.

In at least one other embodiment of the present application, a method includes enabling a navigation device 200 to output a warning to break from driving a vehicle, in which the navigation device 200 is located; determining a route of travel, in the navigation device 200, based upon at least a received destination location; determining whether or not travel along the determined route will at least one of meet and exceed a first threshold; and outputting the warning to break from driving a vehicle, in which the navigation device 200 is located, upon the warning being enabled and upon determining that travel along the determined route will at least one of meet and exceed a first threshold.

In at least one other embodiment of the present application, a device includes an integrated input and display device 290 to enable a navigation device 200 to output a warning to break from driving a vehicle, in which the navigation device 200 is located; and a processor 210 to determine a route of travel, in the navigation device 200, based upon at least a received destination location and to determine whether or not travel along the determined route will at least one of meet and exceed a first threshold, the warning to break from driving a vehicle, in which the navigation device 200 is located, being output via at least the integrated input and display device 290 upon the warning being enabled and upon the processor 210 determining that travel along the determined route will at least one of meet and exceed a first threshold.

FIG. 8 illustrates a display screen for an example of an embodiment of a method of the present application. In this example embodiment, a user is initially able to enable a navigation device 200 to output a warning to break from driving a vehicle, in which the navigation device 200 is located. For example, an initial screen as shown in FIG. 8 can be displayed to the user, on the integrated input and display device 290 for example, providing the user with a selectable option to enable output of warning break. Thereafter, a route of travel may be determined based upon at least a received destination location, and then it may be determined whether or not travel along the determined route will at least one of meet and exceed a first threshold, somewhat similar to that previously described with regard to FIGS. 5A and 5B, in steps S3 and S9 for example (with such similar steps being omitted herein for the sake of brevity). However, different from that of FIGS. 5A and 5B, instead of prompting a user to enable output of a warning of a break from driving a vehicle subsequent to making the determination that travel along the determined route will at least one of meet and exceed a first threshold, as the warning break is already enabled based upon the selection of FIG. 8, the warning break may be output to the user.

Thus, upon the processor 210 determining that travel along the determined route will at least one of meet and exceed a first threshold, the warning may be output to break from driving a vehicle, in which the navigation device 200 is located. Somewhat similarly to that previously described with regard to FIG. 6A for example, during travel along the determined route, it can be determined whether or not a second threshold is met, a second threshold being less than the first threshold, wherein the warning is output upon determining that the second threshold is met. Other aspects of FIGS. 5A-7 are additionally applicable to this additional embodiment, as will be understood by those of ordinary skill in the art.

It should be noted that each of the aforementioned aspects of an embodiment of the present application have been described with regard to the method of the present application. However, at least one embodiment of the present application is directed to a navigation device 200, including an integrated input and display device 290 to enable a navigation device 200 to output a warning to break from driving a vehicle, in which the navigation device 200 is located; and a processor 210 to determine a route of travel, in the navigation device 200, based upon at least a received destination location and to determine whether or not travel along the determined route will at least one of meet and exceed a first threshold, the warning to break from driving a vehicle, in which the navigation device 200 is located, being output via at least the integrated input and display device 290 upon the warning being enabled and upon the processor 210 determining that travel along the determined route will at least one of meet and exceed a first threshold. Such a navigation device 200 may be used to perform the various aspects of the method described with regard to FIG. 8, as would be understood by one of ordinary skill in the art. Thus, further explanation is omitted for the sake of brevity.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBOL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising: determining a route of travel, in a navigation device, based upon at least a received destination location; determining whether or not travel along the determined route will at least one of meet and exceed a first threshold; and prompting, upon determining that travel along the determined route will at least one of meet and exceed the first threshold, a user of the navigation device to enable output of a warning to break from driving a vehicle, in which the navigation device is located, during travel along the determined route wherein the prompting includes displaying, on an integrated input and display device of the navigation device, at least one of a selection to enable output of the warning and a selection not to enable output of the warning, wherein the enabling occurs subsequent to receipt of an indication of a selection to enable the warning output.

2. The method of claim 1, further comprising: determining, during travel along the determined route and upon the warning output being enabled, whether or not at least a second threshold is met, the second threshold being less than the first threshold; and outputting the warning upon determining that the second threshold is met.

3. The method of claim 2, wherein the outputting of the warning includes displaying at least one of an icon and a message on the integrated input and display device of the navigation device.

4. The method of claim 3, wherein the at least one of an icon and a message are displayed on the integrated input and display of the navigation device for a limited duration.

5. The method of claim 2, wherein the warning is output for a limited duration.

6. The method of claim 5, wherein the determining includes determining, during travel along the determined route and upon the warning output being enabled, whether or not at least one additional threshold is met, the at least one additional threshold being less than the first threshold, and wherein the warning is again output upon determining that the at least one additional threshold is met.

7. The method of claim 6, wherein the outputting of the warning includes displaying at least one of an icon and a message on the integrated input and display of the navigation device, the at least one of an icon and a message being displayed on the integrated input and display device of the navigation device for a limited duration.

8. The method of claim 7, wherein the display of at least one of an icon and a message is varied in color based upon the at least one additional threshold representing a time for the driving break being met.

9. The method of claim 8, wherein the outputting of the warning includes output of an audible warning, at least upon the at least one additional threshold, representing a time for the driving break, being met.

10. The method of claim 9, wherein the outputting of the warning includes displaying at least one of an icon and a message on the integrated input and display device of the navigation device, the at least one of an icon and a message being displayed on the integrated input and display device of the navigation device for a limited duration.

11. The method of claim 10, wherein the display of at least one of an icon and a message is varied in color based upon the at least one additional threshold representing a time for the driving break being met.

12. The method of claim 3, wherein the icon is selectable, the method further comprising outputting selectable options to aid in implementing the driving break, upon receipt of an indication of selection of the icon.

13. The method of claim 7, wherein the icon is selectable, the method further comprising outputting selectable options to aid in implementing the driving break, upon receipt of an indication of selection of the icon.

14. The method of claim 10, wherein the icon is selectable, the method further comprising outputting selectable options to aid in implementing the driving break, upon receipt of an indication of selection of the icon.

15. The method of claim 12, wherein the selectable options include points of interest along the determined route of travel.

16. The method of claim 13, wherein the selectable options include points of interest along the determined route of travel.

17. The method of claim 14, wherein the selectable options include points of interest along the determined route of travel.

18. The method of claim 2, wherein the outputting includes at least one of an audible output and a visual output.

19. The method of claim 2, wherein the determining of whether or not travel along the determined route will at least one of meet and exceed the second threshold, is based upon a comparison between the second threshold and at least one of a time parameter and a distance parameter.

20. The method of claim 2, wherein the determining of whether or not travel along the determined route will at least one of meet and exceed the second threshold, is based upon a comparison between a time count during operation of the navigation device and the second threshold.

21. The method of claim 20, wherein the time count begins when at least one of the navigation device is docked, and the vehicle, in which the navigation device is located, is traveling at a speed above a threshold speed.

22. The method of claim 20, wherein the time count is paused when at least one of the navigation device is un-docked, and the vehicle, in which the navigation device is located, is traveling at a speed below a threshold speed.

23. The method of claim 21, wherein the time count is paused when at least one of the navigation device is un-docked, and the vehicle, in which the navigation device is located, is traveling at a speed below a threshold speed.

24. The method of claim 6, wherein the determining of whether or not travel along the determined route will at least one of meet and exceed the second threshold and the at least one additional threshold, is based upon a comparison between at least one of the second threshold and the at least one additional threshold, and at least one of a time parameter and a distance parameter.

25. The method of claim 6, wherein the determining of whether or not travel along the determined route will at least one of meet and exceed at least one of the second threshold and the at least one additional threshold, is based upon a comparison between a time count during operation of the navigation device and the second threshold.

26. The method of claim 6, wherein the time count begins when at least one of the navigation device is docked, and the vehicle, in which the navigation device is located, is traveling at a speed above a threshold speed.

27. The method of claim 25, wherein the time count is paused when at least one of the navigation device is un-docked, and the vehicle, in which the navigation device is located, is traveling at a speed below a threshold speed.

28. The method of claim 26, wherein the time count is paused when at least one of the navigation device is undocked, and the vehicle, in which the navigation device is located, is traveling at a speed below a threshold speed.

29. A computer readable medium including program segments for, when executed on a processor of a navigation device, causing the navigation device to implement a method comprising: determining a route of travel, in a navigation device, based upon at least a received destination location; determining whether or not travel along the determined route will at least one of meet and exceed a first threshold; and prompting, upon determining that travel along the determined route will at least one of meet and exceed the first threshold, a user of the navigation device to enable output of a warning to break from driving a vehicle, in which the navigation device is located, during travel along the determined route wherein the prompting includes displaying, on an integrated input and display device of the navigation device, at least one of a selection to enable output of the warning and a selection not to enable output of the warning, wherein the enabling occurs subsequent to receipt of an indication of a selection to enable the warning output.

30. A computer readable medium including program segments for, when executed on a processor of a navigation device, causing the navigation device to implement a method comprising: determining a route of travel, in a navigation device, based upon at least a received destination location; determining whether or not travel along the determined route will at least one of meet and exceed a first threshold; and prompting, upon determining that travel along the determined route will at least one of meet and exceed the first threshold, a user of the navigation device to enable output of a warning to break from driving a vehicle, in which the navigation device is located, during travel along the determined route wherein the prompting includes displaying, on an integrated input and display device of the navigation device, at least one of a selection to enable output of the warning and a selection not to enable output of the warning, wherein the enabling occurs subsequent to receipt of an indication of a selection to enable the warning output and determining, during travel along the determined route and upon the warning output being enabled, whether or not at least a second threshold is met, the second threshold being less than the first threshold; and outputting the warning upon determining that the second threshold is met.

31. A method, comprising: enabling a navigation device to output a warning to break from driving a vehicle, in which the navigation device is located; determining a route of travel, in the navigation device, based upon at least a received destination location; determining whether or not travel along the determined route will at least one of meet and exceed a first threshold; and outputting the warning to break from driving a vehicle, in which the navigation device is located, upon the warning being enabled and upon determining that travel along the determined route will at least one of meet and exceed a first threshold, and determining, during travel along the determined route and upon the warning output being enabled, whether or not at least a second threshold is met, the second threshold being less than the first threshold, wherein the warning is output upon determining that the second threshold is met.

32. The method of claim 31 wherein the outputting of the warning includes displaying at least one of an icon and a message on the integrated input and display of the navigation device.

33. The method of claim 32, wherein the at least one of an icon and a message are displayed on the integrated input and display of the navigation device for a limited duration.

34. The method of claim 31, wherein the determining includes determining, during travel along the determined route and upon the warning output being enabled, whether or not at least one additional threshold is met, the at least one additional threshold being less than the first threshold, and wherein the warning is again output upon determining that the at least one additional threshold is met.

35. The method of claim 31, wherein the warning is output at a time when the second threshold is met and at a threshold driving break time.

36. The method of claim 35, wherein the outputting of the warning includes displaying at least one of an icon and a message on the integrated input and display of the navigation device, the at least one of an icon and a message being displayed on the integrated input and display of the navigation device for a limited duration.

37. The method of claim 36, wherein the display of at least one of an icon and a message is varied in color based upon the at least one additional threshold representing a time for the driving break being met.

38. The method of claim 32, wherein the icon is selectable, the method further comprising outputting selectable options to aid in implementing the driving break, upon receipt of an indication of selection of the icon.

39. The method of claim 38, wherein the selectable options include points of interest along the determined route of travel.

40. The method of claim 31 wherein the outputting includes at least one of an audible output and a visual output.

41. The method of claim 31, wherein the determining of whether or not travel along the determined route will at least one of meet and exceed the second threshold, is based upon a comparison between the second threshold and at least one of a time parameter and a distance parameter.

42. The method of claim 31, wherein the determining of whether or not travel along the determined route will at least one of meet and exceed the second threshold, is based upon a comparison between a time count during operation of the navigation device and the second threshold.

43. The method of claim 42, wherein the time count begins when at least one of the navigation device is docked, and the vehicle, in which the navigation device is located, is traveling at a speed above a threshold speed.

44. The method of claim 42, wherein the time count is paused when at least one of the navigation device is undocked, and the vehicle, in which the navigation device is located, is traveling at a speed below a threshold speed.

45. The method of claim 43, wherein the time count is paused when at least one of the navigation device is undocked, and the vehicle, in which the navigation device is located, is traveling at a speed below a threshold speed.

46. The method of claim 34, wherein the determining of whether or not travel along the determined route will at least one of meet and exceed the second threshold and the at least one additional threshold, is based upon a comparison between at least one of the second threshold and the at least one additional threshold, and at least one of a time parameter and a distance parameter.

47. The method of claim 34, wherein the determining of whether or not travel along the determined route will at least one of meet and exceed at least one of the second threshold and the at least one additional threshold, is based upon a comparison between a time count during operation of the navigation device and the second threshold.

48. The method of claim 47, wherein the time count begins when at least one of the navigation device is docked, and the vehicle, in which the navigation device is located, is traveling at a speed above a threshold speed.

49. The method of claim 47, wherein the time count is paused when at least one of the navigation device is undocked, and the vehicle, in which the navigation device is located, is traveling at a speed below a threshold speed.

50. The method of claim 48, wherein the time count is paused when at least one of the navigation device is undocked, and the vehicle, in which the navigation device is located, is traveling at a speed below a threshold speed.

51. A computer readable medium including program segments for, when executed on a processor of a navigation device, causing the navigation device to implement a method comprising: enabling a navigation device to output a warning to break from driving a vehicle, in which the navigation device is located; determining a route of travel, in the navigation device, based upon at least a received destination location; determining whether or not travel along the determined route will at least one of meet and exceed a first threshold; and outputting the warning to break from driving a vehicle, in which the navigation device is located, upon the warning being enabled and upon determining that travel along the determined route will at least one of meet and exceed a first threshold, and determining, during travel along the determined route and upon the warning output being enabled, whether or not at least a second threshold is met, the second threshold being less than the first threshold, wherein the warning is output upon determining that the second threshold is met.

52. A computer readable medium including program segments for, when executed on a processor of a navigation device, causing the navigation device to implement a method comprising: enabling a navigation device to output a warning to break from driving a vehicle, in which the navigation device is located; determining a route of travel, in the navigation device, based upon at least a received destination location; determining whether or not travel along the determined route will at least one of meet and exceed a first threshold; and outputting the warning to break from driving a vehicle, in which the navigation device is located, upon the warning being enabled and upon determining that travel along the determined route will at least one of meet and exceed a first threshold, and determining, during travel along the determined route and upon the warning output being enabled, whether or not at least a second threshold is met, the second threshold being less than the first threshold, wherein the warning is output upon determining that the second threshold is met and determining, during travel along the determined route and upon the warning output being enabled, whether or not at least one additional threshold is met, the at least one additional threshold being less than the first threshold, and wherein the warning is again output upon determining that the at least one additional threshold is met.

53. A navigation device, comprising: a processor to determine a route of travel based upon at least a received destination location and to determine whether or not travel along the determined route will at least one of meet and exceed a first threshold; and an output device to prompt, upon the processor determining that travel along the determined route will at least one of meet and exceed the first threshold, a user of the navigation device to enable output of a warning to break from driving a vehicle, in which the navigation device is located, during travel along the determined route wherein the output device includes an integrated input and display device, to display at least one of a selection to enable output of the warning and a selection not to enable output of the warning, wherein the enabling occurs subsequent to receipt of an indication of a selection to enable the warning output.

54. The navigation device of claim 53, wherein the processor is further useable to determine, during travel along the determined route and upon the warning output being enabled, whether or not at least a second threshold is met, the second threshold being less than the first threshold and wherein the output device is useable to output the warning upon determining that the second threshold is met.

55. The navigation device of claim 54, wherein the outputting of the warning includes displaying at least one of an icon and a message on the integrated input and display of the navigation device.

56. The navigation device of claim 55, wherein the at least one of an icon and a message are displayed on the integrated input and display of the navigation device for a limited duration.

57. The navigation device of claim 54, wherein the warning is output for a limited duration.

58. The navigation device of claim 57, wherein the processor is further useable to determine, during travel along the determined route and upon the warning output being enabled, whether or not at least one additional threshold is met, the at least one additional threshold being less than the first threshold, and wherein the warning is again output upon determining that the at least one additional threshold is met.

59. The navigation device of claim 58, wherein the outputting of the warning includes displaying at least one of an icon and a message on the integrated input and display of the navigation device, the at least one of an icon and a message being displayed on the integrated input and display of the navigation device for a limited duration.

60. The navigation device of claim 59, wherein the display of at least one of an icon and a message is varied in color based upon the at least one additional threshold representing a time for the driving break being met.

61. The navigation device of claim 54, wherein the warning is output at a time when the second threshold is met and at a threshold driving break time.

62. The navigation device of claim 61, wherein the outputting of the warning includes displaying at least one of an icon and a message on the integrated input and display of the navigation device, the at least one of an icon and a message being displayed on the integrated input and display of the navigation device for a limited duration.

63. The navigation device of claim 62, wherein the display of at least one of an icon and a message is varied in color based upon the at least one additional threshold representing a time for the driving break being met.

64. The navigation device of claim 55, wherein the icon is selectable, and the integrated input and display device is further useable to output selectable options to aid in implementing the driving break, upon receipt of an indication of selection of the icon.

65. The navigation device of claim 59, wherein the icon is selectable, and the integrated input and display device is further useable to output selectable options to aid in implementing the driving break, upon receipt of an indication of selection of the icon.

66. The navigation device of claim 62, wherein the icon is selectable, and the integrated input and display device is further useable to output selectable options to aid in implementing the driving break, upon receipt of an indication of selection of the icon.

67. The navigation device of claim 64, wherein the selectable options include points of interest along the determined route of travel.

68. The navigation device of claim 64, wherein the selectable options include points of interest along the determined route of travel.

69. The navigation device of claim 65, wherein the selectable options include points of interest along the determined route of travel.

70. The navigation device of claim 66, wherein the selectable options include points of interest along the determined route of travel.

71. The navigation device of claim 54, wherein the outputting includes at least one of an audible output and a visual output.

72. The navigation device of claim 54, wherein the determining of whether or not travel along the determined route will at least one of meet and exceed the second threshold, is based upon a comparison between the second threshold and at least one of a time parameter and a distance parameter.

73. The navigation device of claim 54, wherein the determining of whether or not travel along the determined route will at least one of meet and exceed the second threshold, is based upon a comparison between a time count during operation of the navigation device and the second threshold.

74. The navigation device of claim 73, wherein the time count begins when at least one of the navigation device is docked, and the vehicle, in which the navigation device is located, is traveling at a speed above a threshold speed.

75. The navigation device of claim 73, wherein the time count is paused when at least one of the navigation device is un-docked, and the vehicle, in which the navigation device is located, is traveling at a speed below a threshold speed.

76. The navigation device of claim 74, wherein the time count is paused when at least one of the navigation device is un-docked, and the vehicle, in which the navigation device is located, is traveling at a speed below a threshold speed.

77. The navigation device of claim 58, wherein the determining of whether or not travel along the determined route will at least one of meet and exceed the second threshold and the at least one additional threshold, is based upon a comparison between at least one of the second threshold and the at least one additional threshold, and at least one of a time parameter and a distance parameter.

78. The navigation device of claim 58, wherein the determining of whether or not travel along the determined route will at least one of meet and exceed at least one of the second threshold and the at least one additional threshold, is based upon a comparison between a time count during operation of the navigation device and the second threshold.

79. The navigation device of claim 78, wherein the time count begins when at least one of the navigation device is docked, and the vehicle, in which the navigation device is located, is traveling at a speed above a threshold speed.

80. The navigation device of claim 78, wherein the time count is paused when at least one of the navigation device is un-docked, and the vehicle, in which the navigation device is located, is traveling at a speed below a threshold speed.

81. The navigation device of claim 79, wherein the time count is paused when at least one of the navigation device is un-docked, and the vehicle, in which the navigation device is located, is traveling at a speed below a threshold speed.

82. A navigation device, comprising: an integrated input and display device to enable a navigation device to output a warning to break from driving a vehicle, in which the navigation device is located; and a processor to determine a route of travel, in the navigation device, based upon at least a received destination location and to determine whether or not travel along the determined route will at least one of meet and exceed a first threshold, the warning to break from driving a vehicle, in which the navigation device is located, being output via at least the integrated input and display device upon the warning being enabled and upon the processor determining that travel along the determined route will at least one of meet and exceed a first threshold wherein the processor is further useable to determine, during travel along the determined route and upon the warning output being enabled, whether or not at least a second threshold is met, the second threshold being less than the first threshold, wherein the warning is output, via at least the integrated input and display device, upon determining that the second threshold is met.

83. The navigation device of claim 82 wherein the outputting of the warning includes displaying at least one of an icon and a message on the integrated input and display of the navigation device.

84. The navigation device of claim 83, wherein the at least one of an icon and a message are displayed on the integrated input and display of the navigation device for a limited duration.

85. The navigation device of claim 82 wherein the processor is further useable to determine, during travel along the determined route and upon the warning output being enabled, whether or not at least one additional threshold is met, the at least one additional threshold being less than the first threshold, and wherein the warning is again output upon determining that the at least one additional threshold is met.

86. The navigation device of claim 82 wherein the warning is output at a time when the second threshold is met and at a threshold driving break time.

87. The navigation device of claim 86, wherein the outputting of the warning includes displaying at least one of an icon and a message on the integrated input and display of the navigation device, the at least one of an icon and a message being displayed on the integrated input and display of the navigation device for a limited duration.

88. The navigation device of claim 87, wherein the display of at least one of an icon and a message is varied in color based upon the at least one additional threshold representing a time for the driving break being met.

89. The navigation device of claim 83, wherein the icon is selectable, the integrated input and display device being further useable to output selectable options to aid in implementing the driving break, upon receipt of an indication of selection of the icon.

90. The navigation device of claim 89, wherein the selectable options include points of interest along the determined route of travel.

91. The navigation device of claim 82, wherein the outputting includes at least one of an audible output and a visual output.

92. The navigation device of claim 82 wherein the determining of whether or not travel along the determined route will at least one of meet and exceed the second threshold, is based upon a comparison between the second threshold and at least one of a time parameter and a distance parameter.

93. The navigation device of claim 82 wherein the determining of whether or not travel along the determined route will at least one of meet and exceed the second threshold, is based upon a comparison between a time count during operation of the navigation device and the second threshold.

94. The navigation device of claim 93, wherein the time count begins when at least one of the navigation device is docked, and the vehicle, in which the navigation device is located, is traveling at a speed above a threshold speed.

95. The navigation device of claim 93, wherein the time count is paused when at least one of the navigation device is un-docked, and the vehicle, in which the navigation device is located, is traveling at a speed below a threshold speed.

96. The navigation device of claim 94, wherein the time count is paused when at least one of the navigation device is un-docked, and the vehicle, in which the navigation device is located, is traveling at a speed below a threshold speed.

97. The navigation device of claim 85, wherein the determining of whether or not travel along the determined route will at least one of meet and exceed the second threshold and the at least one additional threshold, is based upon a comparison between at least one of the second threshold and the at least one additional threshold, and at least one of a time parameter and a distance parameter.

98. The navigation device of claim 85, wherein the determining of whether or not travel along the determined route will at least one of meet and exceed at least one of the second threshold and the at least one additional threshold, is based upon a comparison between a time count during operation of the navigation device and the second threshold.

99. The navigation device of claim 98, wherein the time count begins when at least one of the navigation device is docked, and the vehicle, in which the navigation device is located, is traveling at a speed above a threshold speed.

100. The navigation device of claim 98, wherein the time count is paused when at least one of the navigation device is un-docked, and the vehicle, in which the navigation device is located, is traveling at a speed below a threshold speed.

101. The navigation device of claim 99, wherein the time count is paused when at least one of the navigation device is un-docked, and the vehicle, in which the navigation device is located, is traveling at a speed below a threshold speed.

* * * * *